US012756639B2

(12) United States Patent
Li et al.

(10) Patent No.: US 12,756,639 B2
(45) Date of Patent: Oct. 6, 2026

(54) AUTOMATED SERVICE LEVEL OBJECTIVES FOR BATCH DATA

(71) Applicant: Express Scripts Strategic Development, Inc., St. Louis, MO (US)

(72) Inventors: Kuochen Li, Avon, CT (US); Ramesh Karnam, Marlton, NJ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 110 days.

(21) Appl. No.: 18/376,517

(22) Filed: Oct. 4, 2023

(65) Prior Publication Data

US 2025/0119364 A1 Apr. 10, 2025

(51) Int. Cl.

*H04L 41/5025* (2022.01)
*H04L 41/50* (2022.01)
*H04L 43/045* (2022.01)

(52) U.S. Cl.

CPC ...... *H04L 41/5025* (2013.01); *H04L 41/5032* (2013.01); *H04L 43/045* (2013.01)

(58) Field of Classification Search

CPC ............. H04L 41/5025; H04L 41/5032; H04L 43/045

See application file for complete search history.

(56) References Cited

U.S. PATENT DOCUMENTS 7,911,964 B1 * 3/2011 Ahmad .................. H04L 65/65 370/252
8,261,277 B2 9/2012 Prabhakar
9,729,615 B2 8/2017 Nair
9,806,907 B2 10/2017 Nachum
10,127,237 B2 11/2018 Jain
10,394,597 B1 * 8/2019 Kowalski .............. G06F 9/5072
10,810,046 B2 10/2020 Patel
10,977,210 B2 4/2021 Chandan
2004/0093381 A1 5/2004 Hodges
2006/0149576 A1 * 7/2006 Ernest .................. G06Q 10/063 705/39
2008/0010293 A1 * 1/2008 Zpevak .................. G06Q 10/06
2011/0246553 A1 10/2011 Somani
2013/0185461 A1 * 7/2013 Narita ................. G06F 11/3051 710/15
2013/0268944 A1 * 10/2013 Fellenstein ........... G06F 9/5011 718/104
2014/0130055 A1 5/2014 Guha
2016/0300142 A1 * 10/2016 Feller ..................... G06N 20/00
2016/0321201 A1 11/2016 Kawahito
2017/0206107 A1 7/2017 Guha
2018/0191812 A1 7/2018 Togashi
2019/0253558 A1 8/2019 Haukioja
2020/0097327 A1 * 3/2020 Beyer ..................... H04L 67/60

(Continued)

*Primary Examiner* — Andrew C Georgandellis
(74) *Attorney, Agent, or Firm* — Carroll, Hoette & Butscher, LLC

(57) ABSTRACT

Implementing Service Level Agreement (SLA) requirements for batch processes. An enterprise workflow platform receives the SLA requirements via a batch administration form for scheduling the batch processes. The enterprise workflow platform persists the SLA requirements in a knowledge base. A batch monitoring tool is integrated with the enterprise workflow platform to retrieve the SLA requirements from the knowledge base and then measure performance of the schedule batch processes against the SLA requirements.

11 Claims, 6 Drawing Sheets

(56) References Cited

U.S. PATENT DOCUMENTS

| | | | | |
|---|---|---|---|---|
| 2020/0366572 | A1* | 11/2020 | Chauhan | H04L 41/5009 |
| 2021/0344725 | A1* | 11/2021 | Visoky | H04L 61/2553 |
| 2021/0390113 | A1 | 12/2021 | Danilov | |
| 2023/0139660 | A1* | 5/2023 | Ghouse | G06F 11/3409<br>718/101 |
| 2024/0095753 | A1* | 3/2024 | Solanki | H04L 41/22 |

* cited by examiner

AUTOMATED SERVICE LEVEL OBJECTIVES FOR BATCH DATA

FIELD

The present disclosure relates generally to data processing and particularly to applying service level objectives to batch data.

BACKGROUND

Consumers of batch data require timely delivery of accurate and complete data in an expected format per a Service Level Agreement (SLA). The SLA is a contract by which a service provider promises to meet certain levels of service availability and performance, as well as potential compensation for a failure to satisfy the SLA. Having a clearly defined SLA improves communications among service providers and consumers of the data and provides increased visibility on data reliability.

Service Level Indicators (SLIs) are quantitative measures or metrics that the service provider uses for reaching the goals (e.g., volume of data, hours since dataset last refreshed) defined by the SLA. Service Level Objectives (SLOs) are internal measurable objectives the service provider wishes to maintain in order to provide adequate time for remediating any anomalies quickly enough to remain in compliance with the SLA. In practice, the SLIs are metrics in a monitoring system and the SLOs are rules for alerting on-call engineers. For example, if the SLA requires data availability of 99.9%, the corresponding SLI measures throughput (i.e., data accessible and retrievable during a given timeframe), and the corresponding SLO is set to 99.99%.

Early detection of possible delays and remediation of errors in critical batch streams has been a challenge because the SLA requirements lack visibility and integration across multiple systems, applications, and services.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of the present disclosure enable SLA data persistency in a cloud computing workflow platform serving as the enterprise book of record, introduce integrations with monitoring tools for measuring data pipeline progress on a predefined schedule, and promptly notify application owners of any anomalies detected during the monitoring.

In an aspect, a method of implementing one or more SLA requirements comprises displaying a user interface and receiving the SLA requirements for batch processes via a batch administration form for scheduling the batch processes. The method also includes persisting the SLA requirements in a knowledge base associated with the enterprise workflow platform and sending the persisted SLA requirements from the knowledge base to a batch monitoring tool. In turn, the batch monitoring tool is configured to measure batch performance against the SLA requirements.

In another aspect, a method of implementing one or more SLA requirements comprises receiving the SLA requirements for one or more batch processes via an enterprise workflow platform and persisting the SLA requirements in a knowledge base associated with the enterprise workflow platform. The method also includes executing at least one Application Programming Interface (API) to regularly retrieve the persisted information in the knowledge base from the enterprise workflow platform and measuring batch performance against the SLA requirements retrieved by the API.

In yet another aspect, a system comprises a display device and an enterprise workflow platform coupled to the display device. The display device displays a user interface including a batch administration form that is configured to receive input of one or more SLA requirements for at least one scheduled batch process. The enterprise workflow platform is configured to receive the input from the batch administration form and to persist the SLA requirements in a knowledge base. The system also includes a batch monitoring tool configured to retrieve the SLA requirements from the knowledge base and to measure performance of the schedule batch process against the SLA requirements.

Other objects and features will be in part apparent and in part pointed out hereinafter.

BRIEF DESCRIPTION OF THE DRAWINGS

The present disclosure will become more fully understood from the detailed description and the accompanying drawings.

Corresponding reference characters indicate corresponding parts throughout the drawings.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

Figure 1:
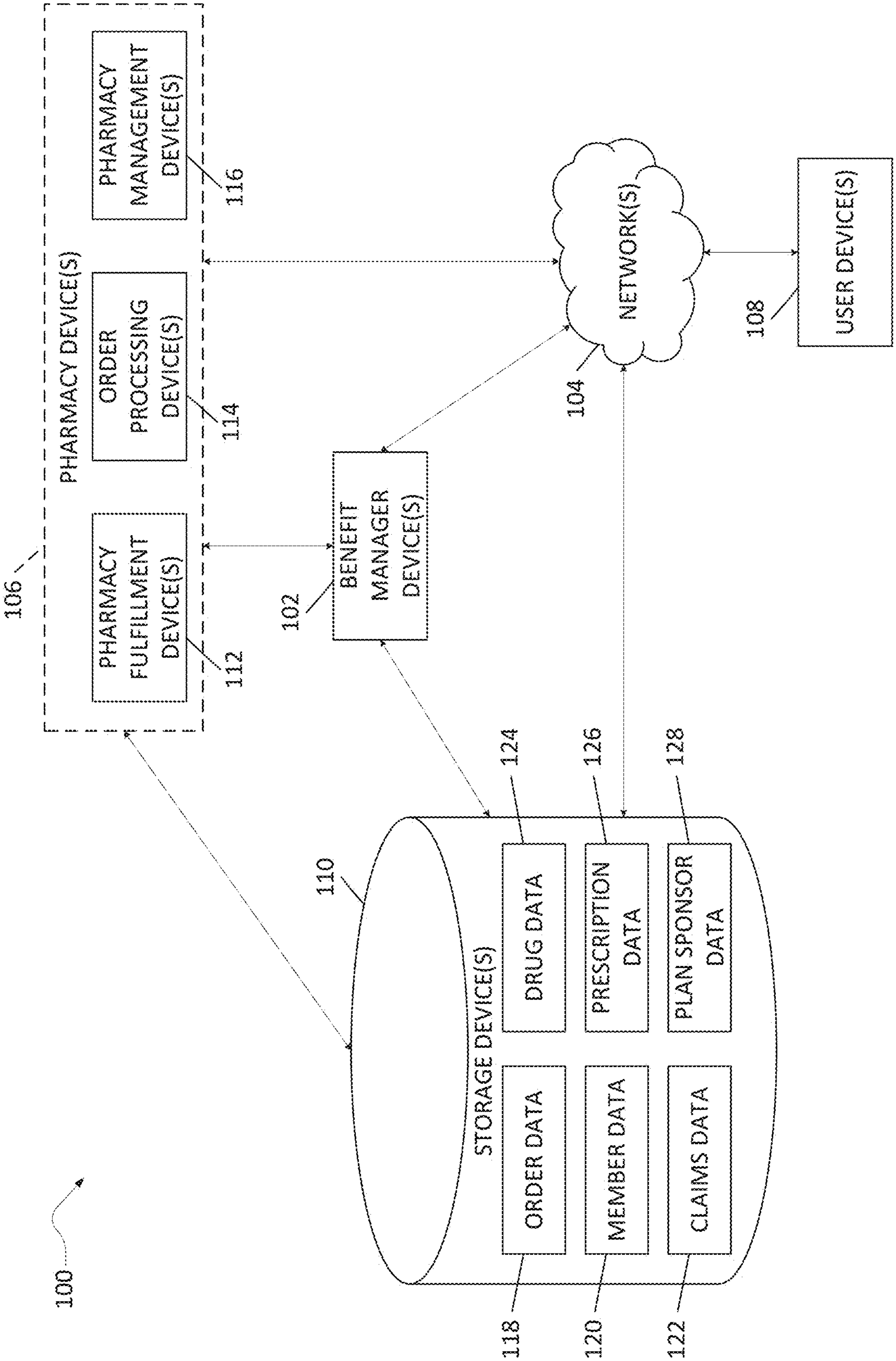
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

Referring further to FIG. 1, the benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. In the embodiment of FIG. 1, the copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102 of FIG. 1) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However, in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

As shown in FIG. 1, benefit manager device 102 and pharmacy device 106 communicate with each other directly and/or over the network 104. Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network

104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

Referring further to FIG. 1, pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

Referring further to FIG. 1, order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 of FIG. 1 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 as shown in FIG. 1 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122. And in some implementations, the claims data 122 includes claims that identify the members with whom the claims are associated. Additionally or alternatively, the claims data 122 may include claims that have been de-identified (that is, associated with a unique identifier but not with a particular, identifiable member).

In an embodiment, the PBM system stores pricing data for drug benefit claims in the form of claims data 122 stored in storage device 110. In response to an adjustment, or repricing, request when a known pricing error occurs, the PBM system can retrieve the pricing data for a selected drug benefit claim associated with the error. As described in detail below, the PBM system generates a predictive model to identify a first predicted set of drug benefit claims impacted by the known error and, in response to the repricing request based on the retrieved pricing data, reprices a sample of the first predicted set of drug benefit claims to adjust for the known error. By training the predictive model as a function of the repriced sample, the PBM system is able to predict a second predicted set of drug benefit claims impacted by the known error.

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 of FIG. 1 includes information regarding the plan sponsors of the PBM. Examples of the plan sponsor data 128 include company name, company address, contact name, contact telephone number, contact e-mail address, etc.

Figure 2:
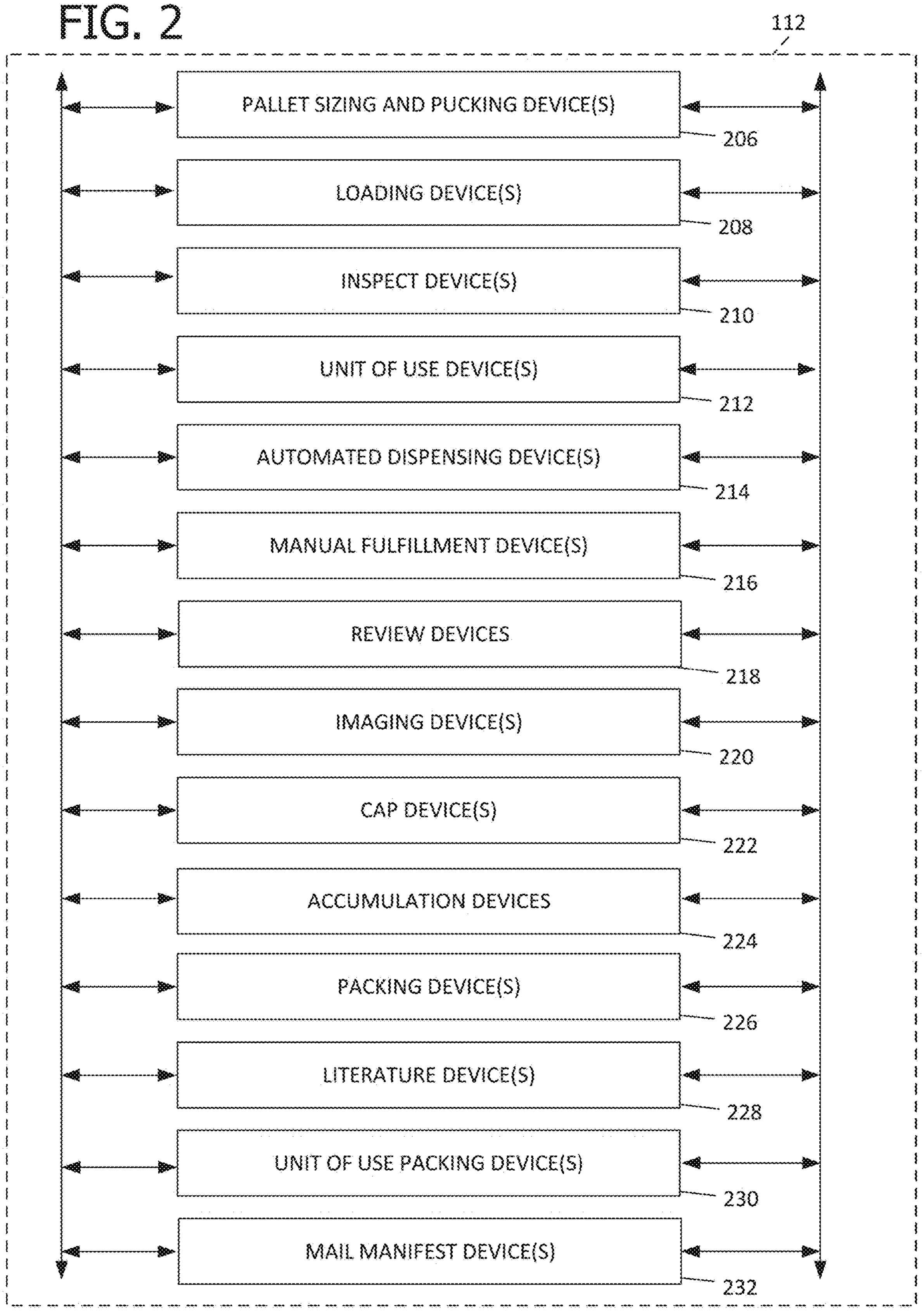
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

Referring further to FIG. 2, in some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 of FIG. 2 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 of FIG. 2 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

Referring further to FIG. 2, the manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 of FIG. 2 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
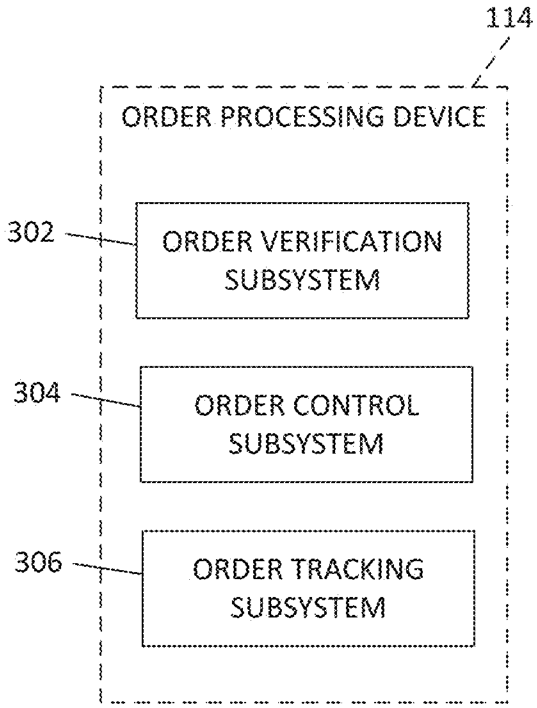
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 and from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Figure 4:
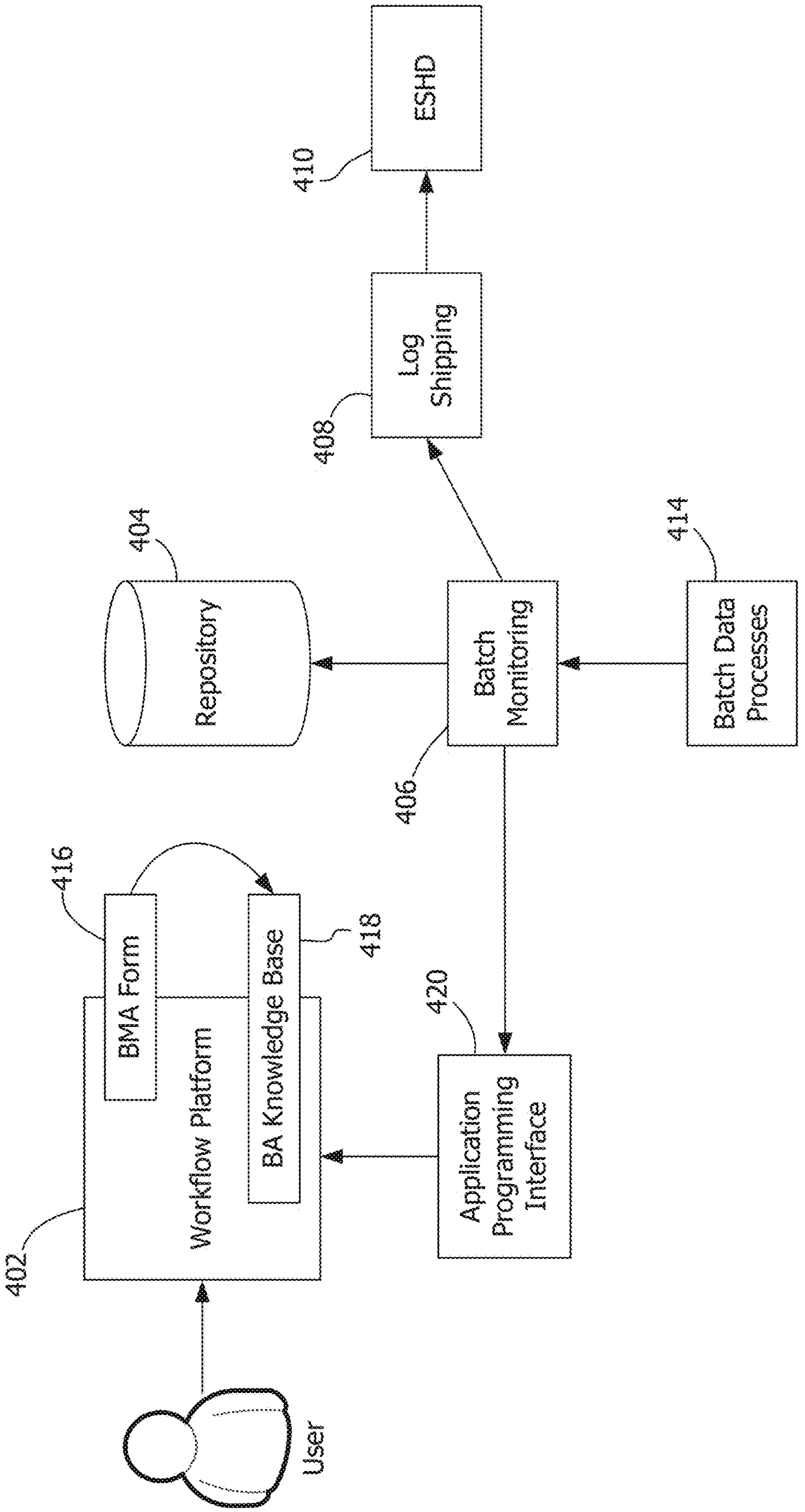
FIG. 4 is a block diagram illustrating a system automating batch SLOs according to an embodiment.

FIG. 4 illustrates an example data pipeline architecture and high level flow implementing aspects of the present disclosure. The illustrated architecture includes an enterprise-scale workflow platform 402, a source repository 404 storing, for example, claims data 122, a batch monitoring tool 406, a log shipping tool 408, and an Enterprise Service Health Dashboard (ESHD) 410. In an embodiment, the workflow platform 402 is implemented by the SERVICENOW® platform available from ServiceNow, Inc., the repository 404 is implemented by the GITHUB® platform available from GitHub, Inc., the batch monitoring tool 406 is implemented by a proprietary tool The Doctor owned by Cigna Advanced Automation Digital Innovation and Solutions, and the log shipping tool 408 and the ESHD 410 are implemented by the SPLUNK® platform available from Splunk Inc.

The following example demonstrates the impact of a failure to satisfy SLIs in processing health plan eligibility. In this example, a health plan daily eligibility file became corrupted and had an inaccurate membership term that resulted in erroneous termination of coverage and rejection of claims. During processing, an elevated level of rejects/terminations within the file data was identified. More than 500,000 members were improperly terminated of their coverage and nearly 50,000 claims were incorrectly rejected during the approximately 30 hours needed to identify the error and load a corrected eligibility file.

One or more of the following pipeline indicators shown in TABLE I, for example, are used for measuring SLA compliance:

TABLE I

| Pipeline Status | Pipeline Delays | Failures Across Pipelines | Failures within Pipelines |
|---|---|---|---|
| Data pipeline status (e.g., Not Started, In Progress, Failed, and Completed) | The delay in the stream represented as % based on historic runs for same day, week, and month | Series of failures in the short span across the pipelines (e.g., environmental issues) | Repeated failures within the pipeline (e.g., data integrity or infrastructure issues) |

Batch data processes 414 execute, for example, ETL (Extract Transform Load) or ELT (Extract Load Transform) processes for moving data from one point to the other through transformations. The standard SLIs used for data pipelines are coverage, correctness, freshness, and throughput. In addition to the above, custom metrics may be built around ETL processes to measure status, delays, multiple failures, etc. across pipelines and within pipelines.

Batch jobs are used to extract large amounts of data for generating reports or performing analytics. As an example, a large amount of data may be used to determine which pharmacies can process and fill prescriptions and prescription orders, and how the prescriptions and prescription orders are processed and filled by the pharmacies. This data can be extensive and complex due to the vast amount of pharmacies and other providers, as well as the arrangements for which pharmacies and other providers are permitted to process and fill prescriptions and prescription orders for a large number of different purchasers having a large number of different insurance plans. The SLA between a pharmacy benefit manager and its clients may require that the benefit manager processes a claim for pharmacy benefits under one or more insurance plans within a short time period. The reliability of the data, including its accuracy and timeliness, is often subject to a contractual agreement (i.e., the SLA) between the pharmacy benefit manager and the insurance plan.

As described above, after receiving the claim, the PBM (such as by using the benefit manager device 102 of FIG. 1) may perform certain adjudication operations including verifying eligibility for the member, identifying/reviewing an applicable formulary for the member to determine any appropriate copayment, coinsurance, and deductible for the prescription drug, and performing a drug utilization review for the member. Further, the PBM may provide a response to the pharmacy (for example, the pharmacy system 100) following performance of at least some of the aforementioned operations.

In addition, SLOs for pipelines consider data quality: completeness, accuracy, consistency, validity, uniqueness, and integrity.

In operation, a user responsible for managing the data pipelines will schedule batch processes 414 using an enterprise scheduling tool (i.e., workflow platform 402). A display device coupled to a computer executing the workflow platform 402 displays a scheduling user interface. The entry point for setting up and scheduling a data pipeline is through a Batch Management Administration (BMA) form 416 presented via the scheduling user interface of enterprise workflow platform 402. In addition to specifying the data sources and schedule, the BMA form 416 is enhanced to add additional fields for specifying SLA requirements, such as job name, schedule, start/end times, stream SLAs, etc.

Aspects of the present disclosure include persisting the SLA information from the BMA form 416 to a new table in the workflow platform 402, indicated in FIG. 4 as Business Application (BA) knowledge base 418. The BA knowledge base 418 also stores contact information for responsible parties who will require prompt notification (e.g., by text message or telephone) in the event of a problem in need of escalation.

The batch monitoring tool 406 executes at least one Application Programming Interface (API) 420 to regularly retrieve the persisted information in BA knowledge base 418 and to then capture the retrieved information in the source repository 404 for maintaining the history. In this manner, the API 420 integrates batch monitoring tool 406 and workflow platform 402. The automated batch solution of FIG. 4 thus creates a periodic data sync process between workflow platform 402 and source repository 404 for tracking batch SLAs. As batch monitoring tool 406 monitors the data pipelines of batch data processes 414 for any delays or failures, it measures the batch performance against the SLAs persisted in BA knowledge base 418 of workflow platform 402 and determines the potential impact in the form of SLOs.

Referring further to FIG. 4, batch monitoring tool 406 persists the batch performance information in log shipping tool 408 and integrates any SLA violations and their business impact with ESHD 410. Notification on any anomalies is done through ESHD 410 in the illustrated embodiment. In this manner, aspects of the present disclosure enable the batch SLAs, detect hidden patterns around pipelines and identify potential downstream impact, and communicate accordingly to provide end-to-end data pipeline visibility and promote proactive measure for minimizing the impact. Integration of API 420 permits the data flow, monitoring, and alerting processes.

Aspects of the present disclosure undertake pipeline measures to accomplish SLOs. For example, a weekly data delivery may include data from dozens of upstream and/or downstream batch jobs. A structured analytics engine generates facts for various models (e.g., outreach, risk scoring, identification) and the SLA requires delivery at a specific time, such as every Friday at 3:00 a.m. Some of the batches may run sequentially such that a delay in one will have a cascading delay throughout the remaining batches. For this reason, alerting the responsible party of a delay as soon as possible is critically important.

Conventional pipelines are not able to capture and persist the SLAs consistently for critical batch processes across upstream and downstream applications. They lack ways to measure the performance against the SLAs and are unable to provide time-sensitive alert triggering that is coupled with ESHD 410 to avoid potential business impact. In addition, conventional pipelines lack data pipeline definitions and measurements for SLIs and have difficulty in defining business impact resulting from platform outage across multiple applications. Aspects of the present disclosure implement a change to capture the SLA information through batch management intake form (i.e., BMA form 416) in the workflow platform 402. In doing so, the SLA information is persisted into the BA knowledge base 418 in the workflow platform 402 and captured in source repository 404 to maintain the history.

Figure 5A:
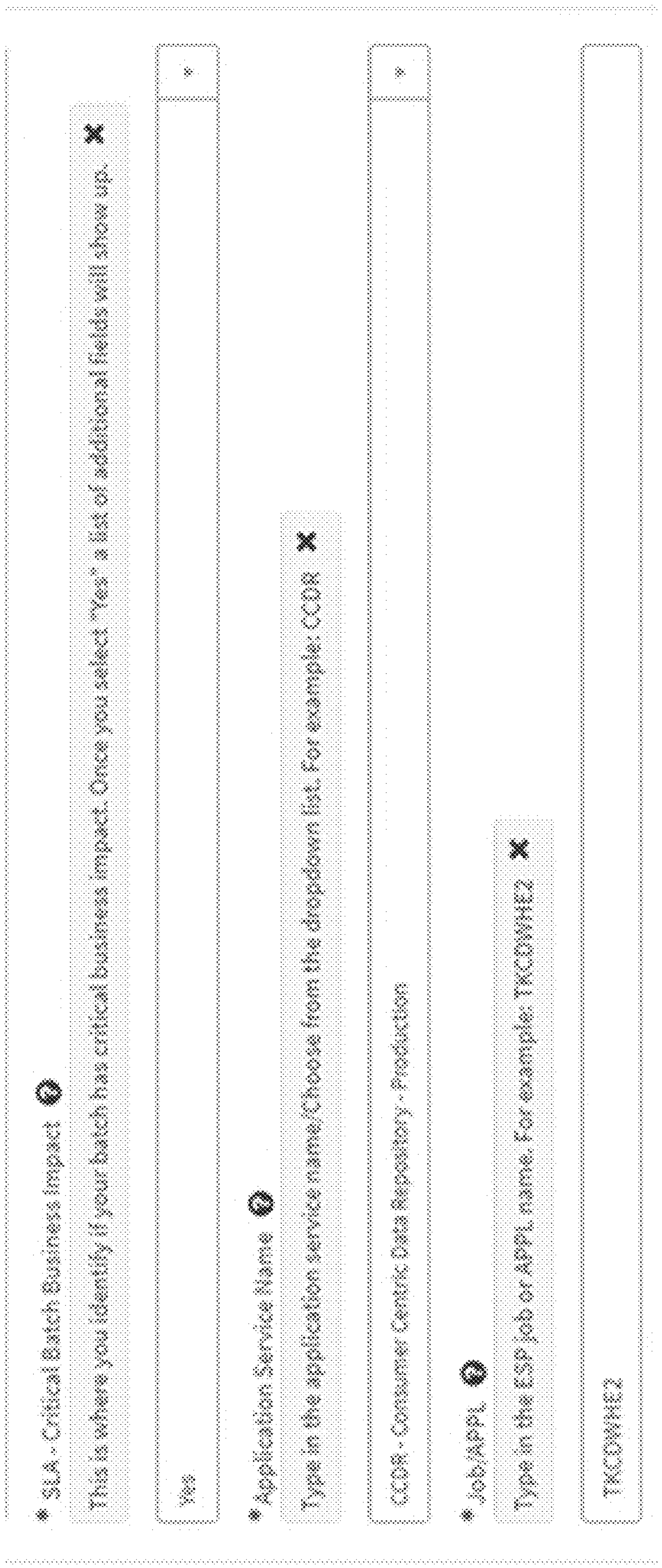
FIGS. 5A and 5B are example screenshots of a batch management form for intake of batch and SLA information according to an embodiment.
Figure 5B:
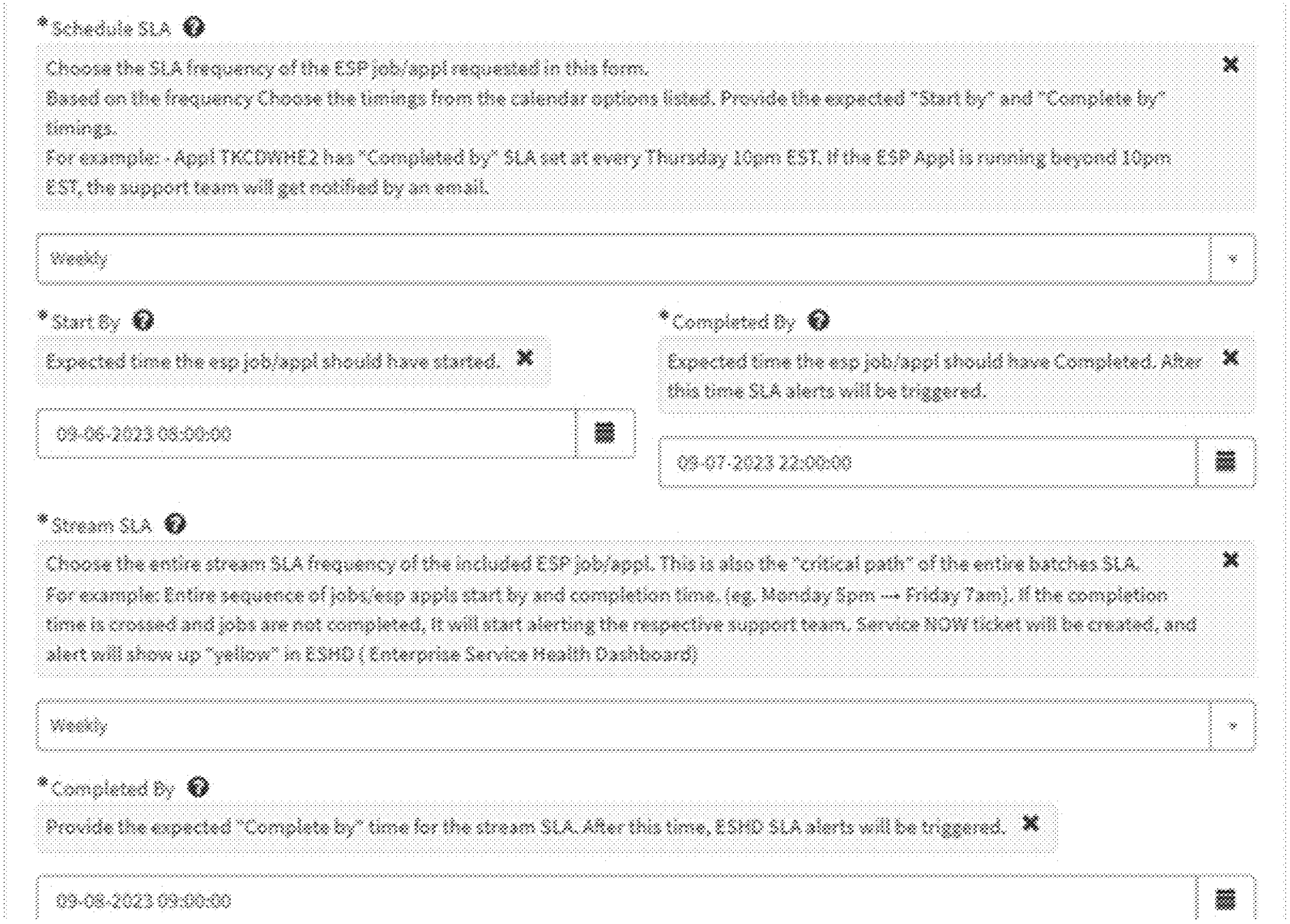

FIGS. 5A and 5B illustrate example screenshots in a batch management form executed by the workflow platform for intake of batch and SLA information.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including “connected,” “engaged,” “interfaced,” and “coupled.” Unless explicitly described as being “direct,” when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean “at least one of A, at least one of B, and at least one of C.”

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term “module” or the term “controller” may be replaced with the term “circuit.” The term “module” may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of implementing one or more Service Level Agreement (SLA) requirements comprising:

displaying, via a user interface a batch administration form for scheduling one or more health plan eligibility and claim adjudication processes for adjudicating pharmacy benefit claims or determining pharmacy benefit eligibility, wherein the batch administration form that is displayed includes a first field for receiving information specifying data sources for the one or more health plan eligibility and claim adjudication processes, a second field for receiving information specifying a schedule for the one or more health plan eligibility and claim adjudication processes, and a third field for receiving information specifying the one or more SLA requirements;

receiving the one or more SLA requirements for the one or more health plan eligibility and claim adjudication processes via the batch administration form including a job name, a schedule, a start time, and an end time for each of the one or more health plan eligibility and claim adjudication processes;

persisting the one or more SLA requirements in a knowledge base associated with an enterprise workflow platform;

communicating the one or more SLA requirements from the knowledge base to a batch monitoring tool via the batch monitoring tool executing an Application Programming Interface (API) on a periodic basis to retrieve the one or more SLA requirements from the knowledge base;

persisting the one or more SLA requirements that are retrieved in a source repository that is communicatively coupled to the batch monitoring tool, each time the one or more SLA requirements are retrieved, to create a periodic SLA data sync between the knowledge base and the source repository;

identifying, via the batch monitoring tool, a failure in processing of a health plan daily eligibility file by the one or more health plan eligibility and claim adjudication processes resulting in erroneous rejection of at least one pharmacy benefit claim;

measuring, via the batch monitoring tool, performance of the one or more health plan eligibility and claim adjudication processes;

identifying, via the batch monitoring tool, a delay in the one or more health plan eligibility and claim adjudication processes by comparing the performance of the one or more health plan eligibility and claim adjudication processes against the one or more SLA requirements;

persisting information relating to the failure and the delay in a log shipping tool using the batch monitoring tool; and notifying responsible parties of a potential issue of compliance with the one or more SLA requirements via a dashboard coupled to the log shipping tool using the batch monitoring tool.

2. The method of claim 1, further comprising persisting contact information for responsible parties in the knowledge base for use in providing notification of a potential issue of compliance with the one or more SLA requirements.

3. The method of claim 2, further comprising storing the contact information in the source repository coupled to the batch monitoring tool.

4. The method of claim 1, further comprising maintaining a history of the one or more SLA requirements in the source repository.

5. A method of implementing one or more Service Level Agreement (SLA) requirements comprising:

receiving the one or more SLA requirements for one or more health plan eligibility and claim adjudication processes for adjudicating pharmacy benefit claims or determining pharmacy benefit eligibility via a batch administration form associated with an enterprise workflow platform, wherein the batch administration form that is displayed includes a first field for receiving information specifying data sources for the one or more health plan eligibility and claim adjudication processes, a second field for receiving information specifying a schedule for the one or more health plan eligibility and claim adjudication processes, and a third field for receiving information specifying the one or more SLA requirements, and wherein the one more SLA requirements include a job name, a schedule, a start time, and an end time for each of the one or more health plan eligibility and claim adjudication processes;

persisting the one or more SLA requirements in a knowledge base associated with the enterprise workflow platform;

executing at least one Application Programming Interface (API) on a periodic basis, via a batch monitoring tool, to regularly retrieve the one or more SLA requirements from the knowledge base associated with the enterprise workflow platform;

persisting, via the batch monitoring tool, the one or more SLA requirements that are retrieved in a source repository that is communicatively coupled to the batch monitoring tool, each time the one or more SLA requirements are retrieved, to create a periodic SLA data sync between the knowledge base and the source repository;

identifying, via the batch monitoring tool, a failure in processing of a health plan daily eligibility file by the one or more health plan eligibility and claim adjudication processes resulting in erroneous rejection of at least one pharmacy benefit claim;

measuring, via the batch monitoring tool, performance of the one or more health plan eligibility and claim adjudication processes;

identifying, via the batch monitoring tool, a delay in the one or more health plan eligibility and claim adjudication processes by comparing the performance of the one or more health plan eligibility and claim adjudication processes against the one or more SLA requirements;

persisting information relating to the failure and the delay in a log shipping tool using the batch monitoring tool; and notifying responsible parties of a potential issue of compliance with the one or more SLA requirements via a dashboard coupled to the log shipping tool using the batch monitoring tool.

6. The method of claim 5, further comprising persisting contact information for responsible parties in the knowledge base for use in providing notification of a potential issue of compliance with the one or more SLA requirements.

7. The method of claim 6, further comprising storing the contact information in the source repository coupled to the batch monitoring tool.

8. The method of claim 5, further comprising maintaining a history of the one or more SLA requirements in the source repository.

9. A system for implementing one or more Service Level Agreement (SLA) requirements in batch processes, the system comprising:

a display device configured to display, via a user interface, a batch administration form for scheduling one or more health plan eligibility and claim adjudication processes for adjudicating pharmacy benefit claims or determining pharmacy benefit eligibility, the batch administration form including a first field for receiving information specifying data sources for the one or more health plan eligibility and claim adjudication processes, a second field for receiving information specifying a schedule for the one or more health plan eligibility and claim adjudication processes, and a third field for receiving information specifying the one or more SLA requirements, and the batch administration form configured to receive input of the one or more SLA requirements for the one or more health plan eligibility and claim adjudication processes including a job name, a schedule, a start time, and an end time for each of the one or more health plan eligibility and claim adjudication processes;

an enterprise workflow platform coupled to the display device, the enterprise workflow platform configured to receive the input from the batch administration form and to persist the one or more SLA requirements in a knowledge base associated with the enterprise workflow platform; and a batch monitoring tool configured to:

execute at least one Application Programming Interface (API) on a periodic basis to regularly retrieve the one or more SLA requirements from the knowledge base;

persist the one or more SLA requirements in a source repository that is communicatively coupled to the batch monitoring tool, each time the one or more SLA requirements are retrieved, to create a periodic SLA data sync between the knowledge base and the source repository;

identify a failure in processing of a health plan daily eligibility file by the one or more health plan eligibility and claim adjudication processes resulting in erroneous rejection of at least one pharmacy benefit claim;

measure performance of the one or more health plan eligibility and claim adjudication processes;

identify a delay in the one or more health plan eligibility and claim adjudication processes by comparing the performance of the one or more health plan eligibility and claim adjudication processes against the one or more SLA requirements;

persist information relating to the failure and the delay in a log shipping tool using the batch monitoring tool; and notify responsible parties of a potential issue of compliance with the one or more SLA requirements via a dashboard coupled to the log shipping tool using the batch monitoring tool.

10. The system of claim 9, wherein the enterprise workflow platform is further configured to persist contact information for responsible parties in the knowledge base for use in providing notification of a potential failure of compliance with the one or more SLA requirements.

11. The system of claim 9, wherein the batch monitoring tool is further configured to maintain a history of the one or more SLA requirements in the source repository.

* * * * *